United States Patent [19]

Tamminen

[11] 4,334,845
[45] Jun. 15, 1982

[54] MACHINE FOR PRODUCING ROLLS OF BAKERY PRODUCTS

[75] Inventor: Teijo T. T. Tamminen, Julkujarvi, Finland

[73] Assignee: Henberg Oy, Helsinki, Finland

[21] Appl. No.: 127,026

[22] Filed: Mar. 4, 1980

[51] Int. Cl.³ .................. B29C 17/00; B29C 23/00; B29F 3/00

[52] U.S. Cl. .................................. 425/104; 99/353; 425/106; 425/200; 425/319; 425/324.1; 425/325; 425/334; 425/335; 425/376 R; 425/377; 425/391; 425/392; 425/394

[58] Field of Search ............... 425/104, 96, 112, 200, 425/319, 321, 323, 329, 334, 324.1, 383, 372, 391, 500, 511, 518, 376 B, 377, 115, 296, 308, 363, 371, 106, 320, 325; 426/499, 500, 502, 517; 99/353; 198/622; 100/152

[56] References Cited

U.S. PATENT DOCUMENTS

| | | | |
|---|---|---|---|
| 1,037,820 | 9/1912 | Carroll | 425/321 |
| 1,757,306 | 5/1930 | Harber et al. | 425/391 |
| 1,906,847 | 5/1933 | Fitzgerald | 425/391 |
| 2,463,112 | 3/1949 | Kipnis | 426/500 |
| 2,657,648 | 11/1953 | Sawyer et al. | 425/391 |
| 2,704,982 | 3/1955 | Rhodes | 425/391 |
| 2,856,868 | 10/1958 | Kennedy | 426/500 |
| 3,027,852 | 4/1962 | Key | 425/391 |
| 3,038,418 | 6/1962 | Gugler | 425/391 |
| 3,121,406 | 2/1964 | Kieffaber | 425/391 |
| 3,585,943 | 6/1971 | Tunguy | 425/391 |
| 3,889,012 | 6/1975 | Riviere et al. | 426/500 |
| 3,993,422 | 11/1976 | Riviere et al. | 425/321 |
| 4,171,197 | 10/1979 | Sato | 99/353 |

FOREIGN PATENT DOCUMENTS

| | | | |
|---|---|---|---|
| 457756 | 6/1949 | Canada | 425/106 |
| 2161039 | 6/1973 | Fed. Rep. of Germany . | |
| 2421720 | 11/1975 | Fed. Rep. of Germany | 425/376 |
| 154280 | 11/1920 | United Kingdom | 425/372 |
| 274999 | 2/1969 | U.S.S.R. | 425/296 |
| 445403 | 10/1972 | U.S.S.R. | 425/334 |

*Primary Examiner*—Willard E. Hoag
*Attorney, Agent, or Firm*—Pollock, Vande Sande & Priddy

[57] ABSTRACT

A machine assembly for producing lengthy rolls of bakery products such as biscuits and the like, wherein the machine includes an inlet work station having a device for forming a plurality of separate bars of dough and the machine also includes an outlet work station having a device for forming a continuous spiral in each of the bars of dough with the spirals interlocking to form a braided roll of dough. The machine assembly further includes a conveyor assembly for transporting the bars of dough between the inlet and outlet work stations while kneading and rolling the bars into their final configuration.

20 Claims, 5 Drawing Figures

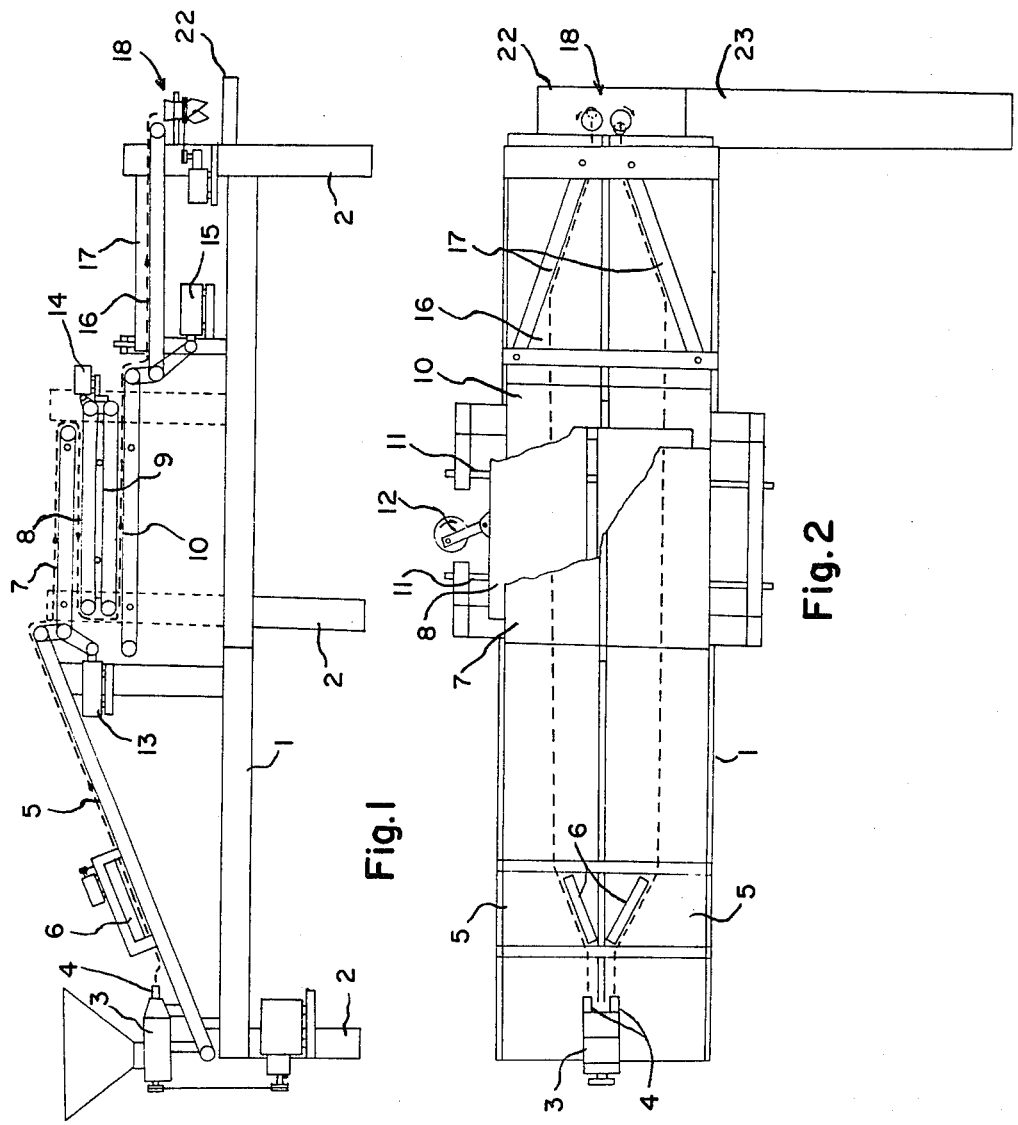

MACHINE FOR PRODUCING ROLLS OF BAKERY PRODUCTS

BACKGROUND OF THE INVENTION

The present invention generally relates to an assembly of the type employed in the manufacture of bakery goods and the like. In particular, the present invention is directed to a uniquely constructed machine for systematically producing relatively lengthy, braided rolls of dough for making biscuits or the like.

One of the factors which often significantly affects the commercial success or failure of a product is the particular manner in which the product is packaged. In recent years, packaging has also come to play a significant role in the sale of food products. For example, it has become increasingly popular to produce braided rolls of certain food products, such as biscuits or the like. Initially, a plurality of separate bars of biscuit dough were usually manually interwoven into a single roll in a complicated and time-consuming procedure. More importantly, the human factor introduced by manual weaving of the dough bars often made it difficult, if not impossible, to uniformly produce substantially identically sized rolls of identical configuration.

In an attempt to overcome the various problems associated with manual weaving or braiding of a plurality of separate dough bars, it was suggested that a machine be constructed for automatically weaving the bars of dough. Such a machine was suggested in German application Publication DOS No. 2,161,039, wherein a relatively complicated mechanism was suggested for weaving separate dough bars, but, proved less than satisfactory in failing to provide uniformly sized dough bars. Rather, such a machine as suggested hereabove in the German application DOS No. 2,161,039 tended to produce dough bars of unequal thicknesses which would tear on even break during the weaving process. As a result, it was often impossible to create the lengthy rolls of braided dough necessary for manufacturing biscuits or the like.

As will be explained in detail hereafter, the present invention provides a machine which overcomes the types of problems discussed hereabove, as well as additional problems which confront prior art machines.

SUMMARY OF THE INVENTION

In a preferred embodiment of the present invention, a machine assembly is provided for forming, transporting and braiding or weaving two or more separate bars of dough into a continuous roll of braided dough adaptable for forming biscuits or the like. In particular, the machine assembly includes an inlet station having a dressing device for selectively forming at least one and preferably a plurality of separate dough bars and for depositing each dough bar onto a uniquely arranged conveyor assembly. The conveyor assembly functions to transport the dough bars through the machine while simultaneously working each dough bar into its substantially final shape. The conveyor assembly deposits the spaced bars of dough into a braiding or weaving device arranged at a further outlet station of the machine assembly; which braiding device selectively interlocks the separate bars of dough into a continuously braided roll of biscuit dough which can be later be cut into specified lengths. A distinctive feature of the present invention is the action of the conveyor assembly in stretching and kneading each dough bar into its substantially uniform shape as it is transported between the dressing and braiding devices.

A further conveyor assembly transports the braided roll from the braiding device, with the further conveyor preferably sloped vertically downwardly from the braiding device to ensure a proper spiral is maintained in the braided roll. The speed of each conveyor assembly is selectively adjustable to maintain proper feed rates for the dough bars, with portions of the conveyor assembly being adjustable to compensate for the natural tendency of the dough bars to stretch and become thinner. Furthermore, portions of the conveyor assembly are selectively vertically adjustable to adjust the direct pressure of confronting portions of the conveyor on the bars of dough passing therebetween.

BRIEF DESCRIPTION OF THE DRAWINGS

The present invention can be best understood with reference to the accompanying drawings, wherein;

FIG. 1 shows a schematic view of a machine assembly formed in accordance with a preferred embodiment of the present invention;

FIG. 2 shows a top view of the machine assembly of FIG. 1;

DETAILED DESCRIPTION OF THE PREFERRED EMBODIMENTS

Figure 3:
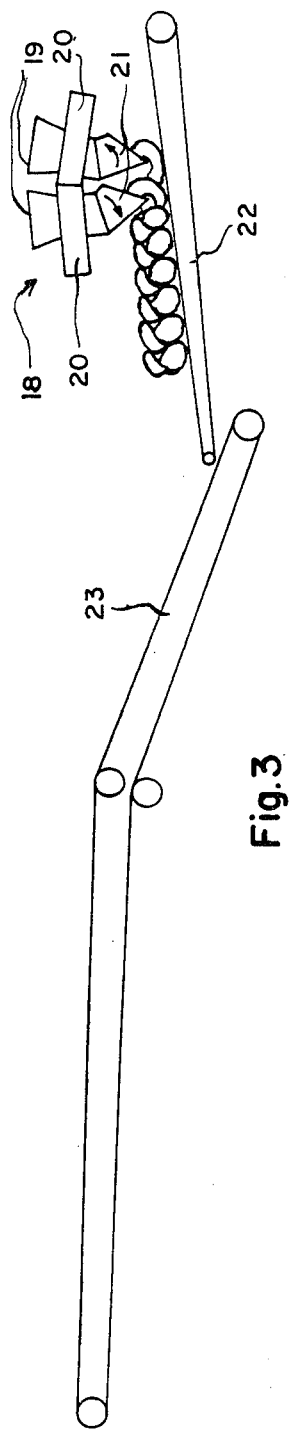
FIG. 3 shows a schematic front view of a portion of the machine assembly of FIG. 1.

The following description of the present invention is to be read in conjunction with the attached drawings wherein, similar apparatus are referred to and are indicated by similar reference numerals.

Referring now to FIGS. 1 and 2, a machine assembly formed in accordance with a preferred embodiment of the present invention will now be described in detail. The machine assembly includes an outstretched framework 1 and a plurality of spaced, feet-like support members 2, each of which extends from framework 1 into contact with a conventional support surface, not shown for purposes of simplicity. In the preferred embodiment, support feet 2 are formed of steel beams. However, it is considered within the scope of the present invention to employ any conventional material either metallic or otherwise in forming the support feet.

An inlet station of the machine assembly includes a dressing device 3 which is conveniently arranged at an end of the machine assembly as best shown in FIGS. 1 and 2. Dressing device 3, in turn, includes at least one, and preferably a plurality of separate nozzle-like mouthpieces, with two of the nozzles each designated by a numeral 4 in FIG. 2. Biscuit dough or the like is conveniently introduced into dressing device 3 through a funnel-shaped inlet, with a separate bar of dough selectively ejected from dressing device 3 through each nozzle-like mouthpiece 4. As shown in FIG. 1, an electric motor may be arranged for powering dressing device 3 through a pulley or the like.

A pair of conveyor assemblies 5 are each supported by framework 1, with each conveyor assembly 5 having a portion passing beneath one of the nozzle-like mouthpieces 4. Each conveyor 5 is inclined in a vertically upwardly direction away from that portion of framework 1 which forms the inlet station including dressing device 3. In other words, each conveyor 5 forms a substantially acute angle with a horizontally extending portion of framework 1. Furthermore, in the preferred embodiment, conveyor assemblies 5 extend substantially parallel to one another, with each conveyor including a continuous, endless belt member driven in a clockwise direction about a pair of support shafts via an adjustable electric motor 13 or the like.

A pair of steering rolls 6 are each fixedly mounted relative to the respective conveyor assemblies 5, with the pair of steering rolls 6 forming a substantially bevel or V-shaped guidance assembly capable of steering the separate bars of dough away from each other and along the separate conveyors 5, as represented by the dotted lines in FIGS. 1 and 2. This ensures that each bar of dough is only transported by its respective conveyor assembly 5, thereby preventing the dough bars from being broken through inadvertent overlapping of both conveyors 5. While a pair of separate steering rolls 6 are shown in FIG. 2, it is considered within the scope of the present invention to employ any number of steering rolls for steering the various dough bars along their respective courses. Each steering roll 6 may also include an automatic mechanism for sprinkling flour or the like onto a respective dough bar as it passes adjacent to the respective steering roll.

A further conveyor assembly is positioned adjacent a forward end portion of each conveyor assembly 5 for receiving the dough bars as they pass from each of the inclined moving conveyor assemblies 5. The further conveyor assembly includes a plurality of vertically stacked conveyors 7–10, each of which extends in a substantially horizontal direction parallel to portions of framework 1. In particular, conveyor assembly 7 is positioned adjacent to and slightly below the forward end of the conveyor assembly 5, with conveyor assembly 7 including a pair of endless belt conveyors each aligned with one of the two conveyor belts forming conveyor assembly 5. Positioned vertically beneath conveyor assembly 7 is a further conveyor assembly 8 which includes a pair of endless belt conveyors each of which is substantially vertically aligned with and extends substantially parallel to one of the conveyor belts forming conveyor assembly 7. In a like manner, a conveyor assembly 9 is positioned substantially beneath conveyor assembly 8 and a conveyor assembly 10 is positioned substantially vertically beneath conveyor assembly 9. Each of the conveyor assemblies 9 and 10 also comprises a pair of parallel extending endless belt conveyors. Each endless conveyor belt forming the conveyor assemblies 7–10 is mounted on a pair of spaced shafts. Furthermore, the vertical position of the various stacked conveyor assemblies is selectively adjustable for a reason which will become clear.

The vertically stacked endless belt conveyor assemblies 7–10 are supported by support surfaces which may be formed of a variety of materials, including, but not limited to, steel or plastic sheets. In addition, the conveyor assemblies 8 and 9 are arranged to move continuously and transversely back and forth along a pair of sliding valves 11 extending therebetween, with valves 11 driven by a crank mechanism schematically indicated by the numeral 12.

During operation, the bars of dough pass from the forward end of each of the conveyor assemblies 5 onto the pair of belt conveyors forming conveyor assembly 7 and are transported away from conveyor assemblies 5 in a direction extending substantially parallel to a longitudinal axis X—X through the machine assembly. For purposes of explanation only, the direction of travel along conveyor assembly 7 will be considered as a forward direction. After reaching an end of conveyor assembly 7 positioned remotely from conveyor assembly 5, the spaced dough bars drop onto an overlapping portion of conveyor assembly 8. Because conveyor assembly 8 is arranged to rotate in a counter-clockwise direction as opposed to the clockwise rotation of conveyor assembly 7, the dough bars are carried by conveyor assembly 8 into the space defined between conveyors 7 and 8. As a result, confronting belt portions of conveyor assemblies 7 and 8 contact and transport the dough bars in a direction toward conveyor assemblies 5, which for purposes of explanation only, will be referred to as a backward direction.

Once they reach the end of conveyor assembly 8 positioned nearest to conveyor assembly 5, the dough bars then drop onto an extended or overlapping portion of conveyor assembly 10. Because endless belt conveyor assembly 10 is arranged to rotate in a clockwise direction similar to conveyor assembly 7, it functions to once again transport the dough bars in a forward direction away from conveyor assembly 5. As the dough bars again move in a forward direction, they contact a confronting belt portion of conveyor assembly 9. Endless belt conveyor assembly 9 is arranged to rotate in a counterclockwise direction about a pair of spaced sprockets or the like. As a result, the confronting portions of both conveyor assemblies 9 and 10 function to contact and transport the bars of dough in the forward direction.

As sliding valves 11 are driven by crank mechanism 12 between conveyors 8 and 9, they force the confronting portions of belt conveyors 7, 8 and 8, 9 to knead and roll the bars of dough passing therebetween. In effect, the dough bars are rolled and worked substantially into their final configurations while being continuously transported through the vertically stacked conveyor assemblies 7–10. Each of the belts employed in the conveyor assemblies 7–10 may be formed of a textile or plastic material, provided it exhibits sufficient flexibility when contacted by sliding valves 11. Furthermore, because the spacing between the various vertically aligned belts can be selectively adjusted by relocating the support shafts, the pressure of the confronting belt portions on the dough bars is selectively adjustable.

A plurality of separate electric motors are employed for driving the separate, vertically stacked conveyor assemblies, wherein the electric motor 13 which drives conveyor assembly may also drive conveyor assembly 7. Likewise, an electric motor 14 may drive conveyor assembly 8 and an electric motor 15 may drive conveyor assembly 10. A separate control assembly associated with each electric motor allows an operator to separately adjust the speed of a particular motor and hence the speed of the conveyor assembly driven by the motor. Because confronting surfaces of belt conveyors assemblies 7 and 8 both engage opposite sides of the dough bars, it is necessary to drive conveyor assemblies 7 and 8 at equal speeds. Likewise, the speeds of conveyor assemblies 9 and 10 are also maintained at a level substantially equal to one another. However, due to the fact that the bars of dough stretch as they pass through the stacked conveyor assemblies, it is necessary to maintain conveyor assemblies 9 and 10 at a slightly faster speed than conveyor assemblies 7 and 8. The stacked conveyor assemblies function to systematically roll and work the bars of dough substantially into their final configurations.

Positioned adjacent to a forward end of conveyor assembly 10 is a separate feeding conveyor assembly 16 which also extends substantially parallel to the longitudinal axis X—X through the machine assembly. Conveyor assembly 16 includes a pair of endless belt conveyors positioned substantially side by side, with each belt conveyor having a rear end portion aligned with and positioned slightly vertically beneath a forward end portion of one of the conveyors forming conveyor assembly 10. A pair of steering members 17 are fixedly mounted above conveyor assembly 16, with each steering member 17 extending substantially diagonally across one of the belt conveyors 16. The steering members 17 extend toward one another to form a bevel or wedge-shaped guidance assembly which functions to steer the spaced dough bars toward one another as they are transported with conveyor assembly 16. In a preferred embodiment, conveyor assembly 16, may also be driven by electric motor 15.

Figure 5:
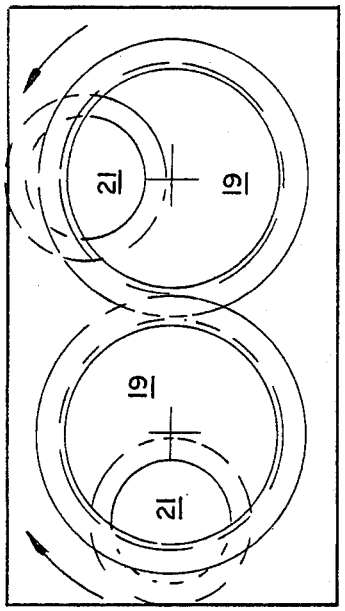
FIG. 5 shows a top view of that portion of the machine assembly shown in FIG. 4.
Figure 4:
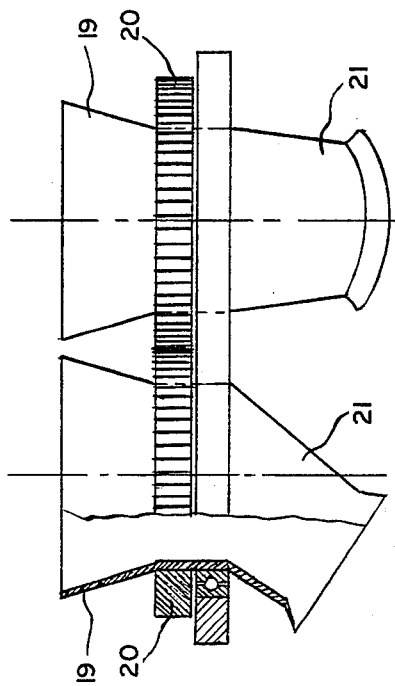
FIG. 4 shows a blow up of a portion of the machine assembly shown in FIG. 3.

A braiding or weaving device 18 is supported at an outlet station which is mounted on a forward end of the machine assembly adjacent to conveyor assembly 16, for a purpose to be explained in detail hereafter. Braiding device 18 includes a pair of rotatable funnel-shaped steering members 19, each of which is substantially aligned with one of the belt conveyors forming conveyor assembly 16. Furthermore, the funnel-shaped members 19 are each positioned such that their longitudinal axes extend substantially parallel to one another and in a direction substantially perpendicular to longitudinal axis X—X passing through the machine assembly. Members 19 are mechanically connected to one another by a pair of gears 20 mounted on each member 19 and having engaging teeth as best shown in FIGS. 3-5, wherein the gears 20 function to rotate the funnel-shaped members 19 in opposite directions about their longitudinal axes when driven by an attached electric motor as shown in FIG. 1.

Each funnel-shaped member 19 includes a relatively large steering aperature extending completely therethrough, allowing a bar of dough to pass easily through the funnel-shaped member. Each funnel-shaped member further includes an exit nozzle or mouthpiece 21 inclined at an angle to the longitudinal axis of the respective member 19. Preferably, the inclined mouthpieces 21 of the two members 19 form an angle of substantially 90° with respect to one another when oppositely disposed. Positioned adjacent and slightly beneath the nozzle-like mouthpieces 21 of the members 19 is a further conveyor assembly 22. Conveyor assembly 22 is arranged at a substantially perpendicular angle to the longitudinal axis X—X of the machine. Conveyor assembly 22 is also slightly inclined or sloped in a vertically downward direction away from braiding device 18. Finally, a further conveyor assembly 23 is aligned with and positioned adjacent to a vertically lower, forward end portion of conveyor assembly 22. Preferably, conveyor assembly 23 also is inclined or sloped in a vertically downward direction away from braiding device 18 as best shown in FIG. 3.

During operation, a separate bar of dough enters one of the oppositely rotating funnel-shaped members 19 from one of the belt conveyors forming conveyor assembly 16. The bars of dough travel through the respective nozzle-like mouthpiece 21 and are laid onto the moving conveyor assembly 22, with each bar forming a continuous spiral. Because the nozzle-like mouthpieces 21 form an angle of substantially 90° and rotate in opposite directions, the dough bars are continuously interlocked one on top of the other, forming a continuous roll bearing a great resemblance to a braided roll of dough. The final form, as well as the thickness of the continuously braided roll is selectively adjusted by merely changing the ratio between the speed of rotation of the funnel-like members 19 and the speed of conveyor 22. Furthermore, the final form of the braided roll can also be altered by adjusting the relative position of the funnel-shaped members 19 to each other, thereby adjusting the position of exit mouthpieces 21.

Preferably, conveyor assembly 22 is driven at a speed which is slightly less than the speed of conveyor assembly 16 in order not to damage the continuous roll formed from the spiral-shaped dough bars resting on conveyor assembly 22. Conveyor 23 functions to transport the braided roll of biscuit dough to a yet further work station, wherein the dough may be cut and baked into biscuits or the like by apparatus which make up no part of the present invention. It is preferable that conveyor 23 move at a speed which is less than the speed of conveyor 22 in order to tighten the braided roll in its longitudinal direction.

While the preferred embodiment of the present invention employs two bars of dough, it is within the scope of the present invention for the machine to employ only a single bar of dough or any member of bars of dough. For example, if three bars of dough are initially formed in the dressing device, the final roll will have three braided strands. It is also noted that the dough strands may be formed as separate, continuous spirals by employing several adjacent, yet separate funnel-shaped members each having a separate mouthpiece, whereby biscuits each twisted into a circle are produced in several rows by merely cutting the spiral at certain points. Furthermore, while pairs of conveyors have been described as forming the various conveyor assemblies, it is considered within the scope of the present invention to form each conveyor assembly from a single conveyor or a plurality of separate conveyors positioned side by side.

The present invention is not to be limited to the above described embodiments, but is to be limited only by the scope of the following claims.

What I claim is:

1. A machine assembly for producing continuous rolls of uniformly sized bakery products such as biscuits and the like, and comprising:
   a machine framework supporting an inlet work station and an outlet work station spaced from one another;
   said inlet work station including a dressing means having at least one outlet nozzle for forming at least one continuous bar of dough;
   said outlet work station including steering funnel means for shaping said at least one continuous bar of dough into a continuous spiral;
   a conveyor assembly providing a continuous passageway moving in a direction parallel to a longitudinal axis of said continuous bar of dough between said inlet work station and said outlet work station, thereby transporting a portion of said continuous bar of dough to said outlet work station while simultaneously transporting a further portion of said continuous bar of dough from said inlet work station; and means for kneading and rolling said at least one continuous bar of dough during passage between said inlet and outlet work stations, respectively.

2. A machine assembly for producing lengthy rolls of bakery products such as biscuits and the like, and comprising:

a machine framework having spaced inlet and outlet work stations each supported thereon;

said inlet work station including means for converting a quantity of dough-like material into at least one continuous bar of dough of predetermined length;

said outlet work station including means for forming a continuous spiral in said at least one continuous bar of dough; and conveyor means for transporting said at least one continuous bar of dough between said inlet and outlet work stations, said conveyor means comprising an array of vertically stacked conveyor assemblies arranged between said inlet and outlet work stations, each of said conveyor assemblies forming a passageway moving in a direction substantially parallel to a longitudinal axis of said at least one continuous bar of dough, wherein at least one conveyor assembly passageway transports a portion of said continuous bar of dough toward said inlet work station and a further, vertically spaced conveyor assembly passageway simultaneously transports a further portion of said continuous bar of dough toward said outlet work station, thereby kneading and rolling said at least one continuous bar substantially into its final cross-sectional configuration.

3. A machine assembly according to claim 2, wherein said conveyor means further comprises at least one conveyor extending between said arrangement of vertically stacked conveyor assemblies and said outlet work station.

4. A machine assembly according to claim 2, wherein a plurality of the vertically stacked conveyor assemblies are adjustable in the vertical direction relative to each other to selectively adjust the size of the continuous passageway extending therebetween.

5. A machine assembly according to claim 2, wherein sliding valve means are arranged between at least one pair of vertically stacked conveyor assemblies for rolling said vertically stacked conveyor assemblies against said at least one continuous bar of dough passing adjacent to said valve means.

6. A machine assembly according to claim 2, wherein the speed each of said plurality of vertically stacked conveyor assemblies is selectively adjustable to compensate for changes in size of said bars of dough.

7. A machine assembly according to claim 2, wherein said conveyor means further comprises at least one conveyor assembly extending between said inlet work station and an inlet of said passageway extending through said arrangement of vertically stacked conveyor assemblies, said conveyor assembly being inclined in upward vertical direction from a horizontal plane extending said inlet work station.

8. A machine assembly according to claim 7, wherein a pair of steering rolls are fixedly attached to said machine assembly and are arranged adjacent to said inclined conveyor assembly, said pair of steering rolls forming a wedge-shaped configuration wherein the distance between said pair of steering rolls increases as the distance from said inlet work station increases, with said pair of steering rolls directing said at least one bar of dough toward a side of said inclined conveyor assembly.

9. A machine assembly according to claim 8, wherein said inlet work station means comprises a dressing device including a pair of outlet nozzles for forming a pair of separate, continuous bars of dough, wherein said pair of steering rolls guide said pair of continuous dough bars toward opposite sides of said inclined conveyor assembly.

10. A machine assembly according to claim 9, wherein said inclined conveyor assembly comprises a pair of endless belt conveyors positioned side-by-side, wherein each belt conveyor supports a separate, continuous dough bar.

11. A machine assembly according to claim 9, wherein said pair of steering rolls include means for selectively sprinkling flour and the like onto said continuous dough bars passing adjacent to said pair of steering rolls.

12. A machine assembly according to claim 2, wherein said inlet work station means comprises a dressing device having at least one inlet and a plurality of spaced outlet nozzles, wherein each outlet nozzle ejects a separate bar of said dough like material.

13. A machine assembly according to claim 12, wherein said outlet work station means comprises a device having at least one steering funnel for each bar of dough-like material formed by said dressing device, wherein each of said steering funnels is rotatable about a main longitudinal axis extending therethrough.

14. A machine assembly according to claim 13, wherein the longitudinal axes of said steering funnels extend in a substantially vertical direction.

15. A machine assembly according to claim 13, wherein each steering funnel includes an outlet portion inclined with respect to the main longitudinal axis extending through said respective steering funnel.

16. A machine assembly according to claim 15, wherein said inclined outlet portions of oppositely disposed steering funnels form a substantially perpendicular angle to one another.

17. A machine assembly according to claim 15, wherein a further conveyor assembly is positioned adjacent to and slightly beneath said inclined outlet portions of said steering funnels for receiving said continuous spirals of dough from each of said rotating steering funnels.

18. A machine assembly according to claim 17, wherein said further conveyor assembly is inclined in a vertically downward direction from a horizontal plane which extends through said outlet work station for transporting said continuously spiraled bars away from said rotating steering funnels.

19. A machine assembly according to claim 17, wherein a separate gear member encircles and is attached to each steering funnel, with the gear members engaging one another to rotate said attached steering funnels in opposite directions about their respective longitudinal axes, thereby ejecting a continuously braided roll onto said further conveyor assembly.

20. A machine assembly according to claim 17, wherein separate conveyor assembly is positioned adjacent to said further conveyor assembly for transporting said braided roll to a further work station, with said separate conveyor assembly moving at a speed which is slower than the speed of said further conveyor assembly to prevent said continuous roll from breaking.

* * * * *